United States Patent
Bulman et al.

(10) Patent No.: US 7,216,474 B2
(45) Date of Patent: May 15, 2007

(54) INTEGRATED AIR INLET SYSTEM FOR MULTI-PROPULSION AIRCRAFT ENGINES

(75) Inventors: Melvin J. Bulman, Folsom, CA (US); Frederick S. Billig, Glenwood, MD (US)

(73) Assignee: Aerojet-General Corporation, Sacramento, CA (US)

( * ) Notice: Subject to any disclaimer, the term of this patent is extended or adjusted under 35 U.S.C. 154(b) by 174 days.

(21) Appl. No.: 10/784,482

(22) Filed: Feb. 19, 2004

(65) Prior Publication Data

US 2006/0107648 A1    May 25, 2006

(51) Int. Cl.
F02K 11/00    (2006.01)

(52) U.S. Cl. ........................... 60/225; 244/53 B

(58) Field of Classification Search ................ 60/225, 60/224, 246, 245, 767, 768, 769, 226.1; 244/53 R, 244/53 B
See application file for complete search history.

(56) References Cited

U.S. PATENT DOCUMENTS

| | | | |
|---|---|---|---|
| 3,883,376 A | 5/1975 | Billig et al. |
| 4,291,533 A | 9/1981 | Dugger et al. |
| 4,667,900 A | 5/1987 | Kim |
| 5,012,638 A | 5/1991 | Grieb et al. |
| 5,052,176 A | 10/1991 | Labatut et al. |
| 5,058,377 A | 10/1991 | Wildner |
| 5,076,052 A | 12/1991 | Wildner |
| 5,135,184 A | 8/1992 | Billig |
| 5,214,914 A | 6/1993 | Billig et al. |
| 5,284,014 A | 2/1994 | Brossier et al. |
| 5,337,975 A | 8/1994 | Pelnemann |
| 5,831,155 A | 11/1998 | Hewitt |
| 5,885,398 A | 3/1999 | Pashea et al. |
| 6,276,632 B1 | 8/2001 | Sanders et al. |
| 6,499,286 B1 | 12/2002 | Zakharov et al. |
| 6,523,339 B2 | 2/2003 | Hubbard |
| 6,584,764 B2 | 7/2003 | Baker |
| 6,637,187 B2 | 10/2003 | Sanders et al. |
| 6,705,569 B1 | 3/2004 | Sanders et al. |
| 2002/0117581 A1 | 8/2002 | Sanders et al. |
| 2003/0034066 A1 | 2/2003 | Sanders et al. |

OTHER PUBLICATIONS

Trefny, C.J. et al.; "An Integration of the Turbojet and Single-Throat Ramjet"; 1995, *Airbreathing Propulsion Subcommittee Meeting sponsored by the Joint Army-Navy-NASA-Air Force Interagency Propulsion Committee*, 14 pages.

Walsh, P.C. et al; "Boundary-layer Correction for the Hypersonic Air Inlet"; 2003, *Mars*, vol. 49, No. 1, pp. 11-17.

*Primary Examiner*—Timothy D. Collins
(74) *Attorney, Agent, or Firm*—Townsend and Townsend and Crew LLp.; Henry Heines

(57) ABSTRACT

An air inlet duct for an air-breathing combined-cycle aircraft engines is internally divided into separate channels for low-speed and high-speed components of the engine, and contains one or more movable panels that are fully contained within the duct and pivotal between an open position in which incoming air is directed to both channels and a closed position in which all incoming air is directed to the channel leading to the high-speed engine. This integrated duct utilizes all incoming air at all stages of flight with no change in either the geometry of the air capture portion of the engine or the engine itself, and no exposure of movable leading edges. The result is a minimum of shock waves and a high degree of efficiency in operation of the engine.

23 Claims, 7 Drawing Sheets

INTEGRATED AIR INLET SYSTEM FOR MULTI-PROPULSION AIRCRAFT ENGINES

BACKGROUND OF THE INVENTION

1. Field of the Invention

This invention resides in the field of air-breathing engines, and particularly combination engines that incorporate both a ramjet component and a low-speed booster component such as a rocket or a turbojet.

2. Description of the Prior Art

Air-breathing engines for hypersonic applications are known as "combined cycle" systems because they use a graduating series of propulsion systems in flight to reach an optimum travel speed or to leave the atmosphere altogether. Air-breathing engines use atmospheric air as a source of oxygen for combustion, as opposed to rockets which carry their own oxidizer. By using air captured from the atmosphere, air-breathing systems are several times more efficient than conventional rockets.

The thrust upon takeoff of a combined cycle engine and operation of the engine at low-to-moderate Mach numbers is achieved by a booster unit which consists of either rockets or turbojets or a combination of the two. Once the vehicle has reached a speed of Mach 2 or greater, the booster unit is replaced by a ramjet (which term is used generically herein to include "scramjet") and acceleration is continued. The booster-to-ramjet transition is a critical stage in the operation of the engine since any loss of air flow through either engine during the transition can result in a loss of compression efficiency. The need to shift inlet air from the booster propulsion system to the high-speed propulsion system has resulted in large geometries that create flow resistance, surfaces and leading edges that produce complex shock waves, areas of separated or recirculating flow, and exposed moving parts that are vulnerable to damage.

SUMMARY OF THE INVENTION

It has now been discovered that a combined cycle engine can be designed with an integrated air duct that receives atmospheric air at an entry region of unchanging dimensions and directs all of the incoming air to operating components of the engine during all stages of acceleration, including the low-speed (booster), transition, and high-speed stages. The air enters through an air inlet that has fixed (i.e., immovable) external walls. A fixed internal wall within the integrated duct divides the interior of the duct into two channels—one leading to the high-speed engine and the other to the low-speed engine. The fixed internal wall has a leading rim commencing either downstream of, or at the downstream end of, the capture tube. The channel leading to the high-speed propulsion system thus begins at this location. A movable panel or series of movable panels within the integrated duct moves between an open position and a closed position and all positions in between, the open position allowing incoming air to enter both the low-speed and high speed channels, and the closed position directing all of the incoming air flow to the high-speed channel. In preferred configurations, the low-speed channel is a peripheral channel, i.e., one that is positioned between the high-speed channel and the external walls of the integrated duct, fully surrounding the high-speed channel. In certain configurations within the scope of this invention, however, the high-speed channel is not coaxial with the integrated duct and the low-speed channel extends only partially around the high-speed channel. In certain embodiments as well, the width of the peripheral channel (leading to the low-speed engine) varies along the circumference of the high-speed channel. In these embodiments, the movable panels are constructed and arranged around the high-speed channel accordingly. In all embodiments, the movable panels are operated during takeoff and acceleration to initially direct all entering air to both the low-speed engine and the high-speed engine and then, after a transition stage during which the proportion of air entering the channel leading to the low-speed engine is gradually reduced, directing all entering air to the high-speed engine.

This invention therefore resides in integrated air ducts for combined-cycle engines and in combined-cycle engines themselves that incorporate these integrated air ducts. In the combined-cycle engines, the low-speed component is either one or more turbojets, one or more rockets, or a combination of rockets and turbojets. Such a combination allows the use of a smaller turbine engine(s) without sacrificing critical thrust during the takeoff and transition stages. One advantage of the integrated air ducts of this invention and the engines in which they are used relative to the prior art is that all incoming air is utilized during all stages of takeoff and acceleration, thereby allowing the use of a larger volume of atmospheric air for combustion at any single stage. This also reduces the weight and volume of the engine as a whole. Another advantage of the engines of this invention is that the arrangement of internal channels and movable panels allows air to enter the high-speed channel while the vehicle is still traveling at a relatively low Mach number, and the movement of the panels provides a smooth transition between the stages. A third advantage is that the movable panels can be constructed without leading edges that are exposed to the high enthalpy air flow. This permits the panels and the engine as a whole to be of more durable construction and to reduce the generation of shock waves that prevent air from entering the engine. The ability to allow air to enter the high-speed engine while the low-speed engine is still operating, the higher mass capture of atmospheric air, the improved pressure recovery, and the reduction in drag caused by the spill of atmospheric air at all speeds collectively result in an engine with a thrust and a specific impulse ($I_{sp}$) that are significantly higher than those of many combined-cycle systems of the prior art.

These and other features, embodiments, and advantages of the invention will be apparent from the description that follows.

DETAILED DESCRIPTION OF THE INVENTION AND PREFERRED EMBODIMENTS

While this invention covers a wide range of configurations, geometries, and applications, an understanding of the features that are common to all embodiments and that define the invention and its operation as a whole can be obtained by a review of specific examples. The drawings accompanying this specification and their description below relate to several such examples; others will be readily apparent to those skilled in the art.

Figure 1:
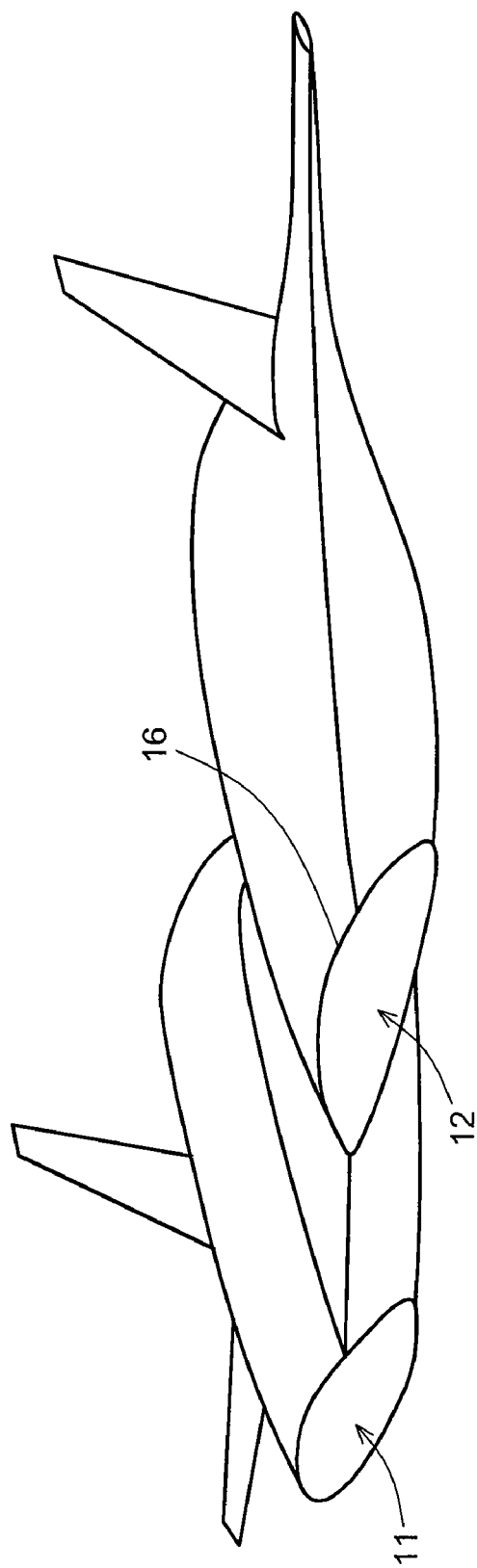
FIG. 1 is a perspective view of an aircraft vehicle incorporating engines and air inlet systems in accordance with the present invention.

A front view of a vehicle containing engines and integrated air ducts in accordance with the present invention is shown in FIG. 1. The vehicle contains two combined-cycle engines with a separate air inlet 11, 12 for each. Inside each of the air inlets are throats of circular cross section that lead to the ramjet engine components. The air inlets 11, 12 are not vertically centered in the vehicle body but instead offset toward the bottom of the vehicle. The opening 16 of each inlet follows the aerodynamically shaped contour of the vehicle, and the shape of the opening can be seen most clearly in the bottom view shown in FIG. 2. As shown in this bottom view, the upper lip 17 of the air inlet extends forward of the remainder of the inlet. The air inlet is thus open at the bottom for much of its length. This opening allows spillage of air from the capture tube to the exterior of the aircraft in response to the shock waves that are generated inside the capture tube during acceleration from low-speed flight. This spillage regulates the air passing into the inlet.

Figure 2:
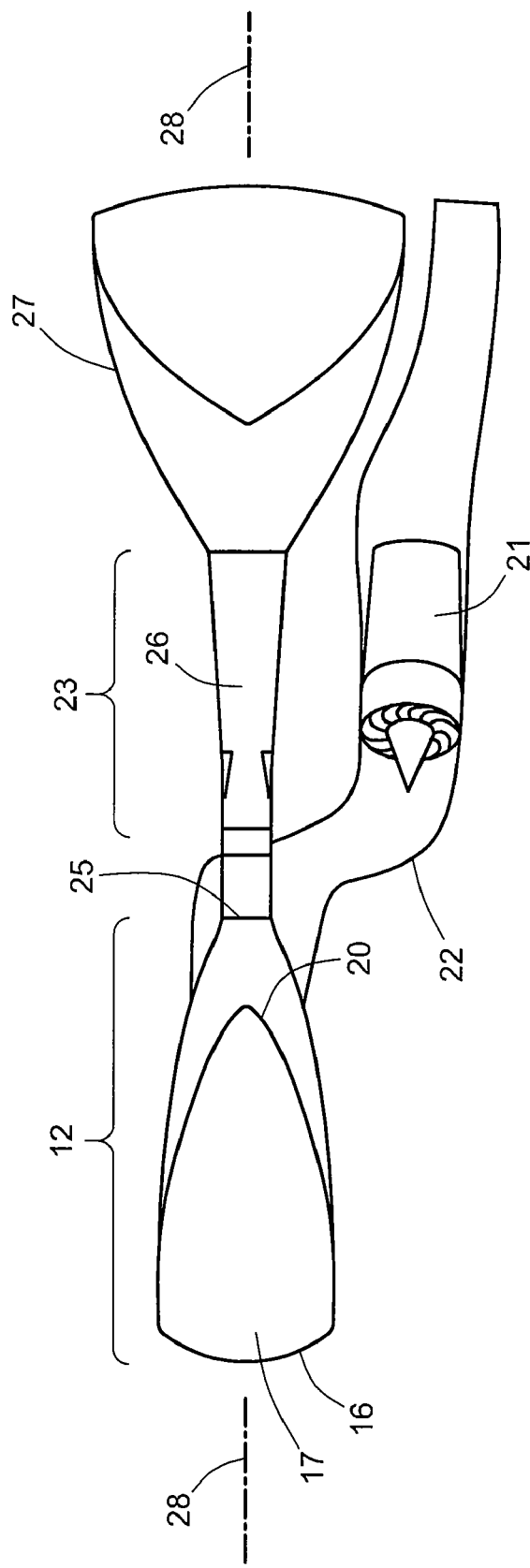
FIG. 2 is a bottom view of one of the air inlet systems and associated engines of the vehicle of FIG. 1.

Of the air entering the inlet 12, the portion that remains within the duct past the downstream end 20 of the opening at the bottom of the inlet remains within the engine, entering the internal channels and feeding whichever engine components are in operation at any given stage of vehicle flight. The engine components themselves are shown in schematic. Of these, the booster engine 21, which in the embodiment of FIG. 2 is a turbine engine, is positioned to one side of the air inlet 12 and receives combustion air from a channel 22 that originates within the air inlet at the periphery of the inlet. The channel 22 is preferably of variable cross section to decelerate the air as necessary to reach subsonic flow. The ramjet or high-speed engine 23 is co-linear with the air inlet from the perspective shown in the drawing, and includes fuel injectors 24, a throat 25, a combustor 26, and a diverging portion 27 to form a supersonic nozzle.

The air inlet 12 and the ramjet components are generally aligned along a longitudinal axis 28 which is approximately parallel to the direction of flight and, with the moving vehicle as a frame of reference, parallel to the direction of the approach of atmospheric air. Cross sections referred to herein as "longitudinal" are those that are taken in planes in which this longitudinal axis resides, while cross sections referred to as "transverse" are those taken in planes that are perpendicular to this axis.

Figure 3:
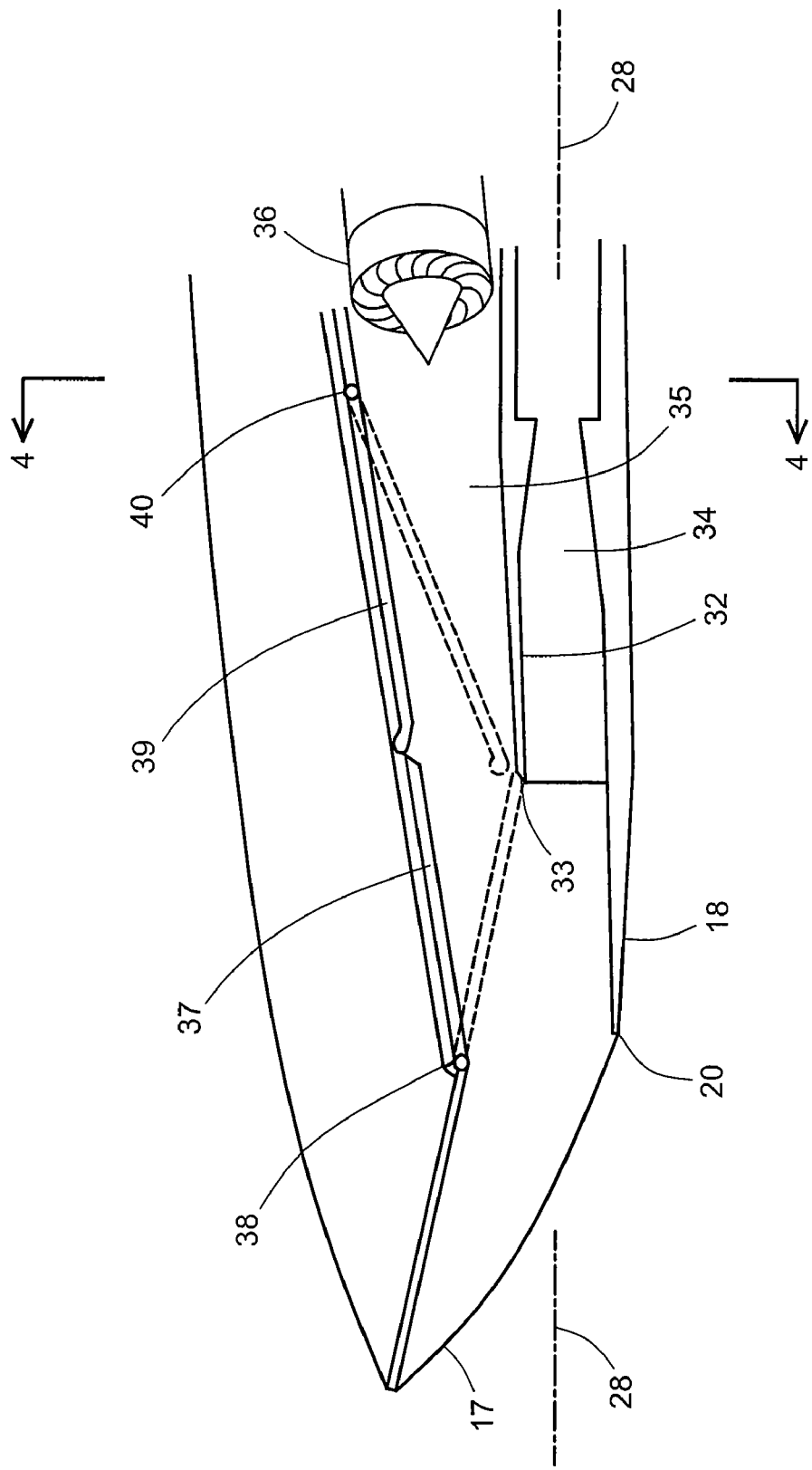
FIG. 3 is a longitudinal cross section of the air inlet system of FIG. 2.

FIG. 3 is a vertical longitudinal cross section of the integrated air inlet of FIG. 2, showing the interior of the integrated air duct and the low-speed and high-speed air channels. The upper lip 17 of the air inlet, as noted above, extends forward of the remainder of the inlet, and the opening along the bottom portion of the inlet tapers to a closure 20 (the taper is shown in FIG. 2). All air remaining within the inlet downstream of this closure 20 is fully available for use by the engines. An internal wall 32 divides the region downstream of the closure point 20 into two channels—a ramjet (high-speed) channel 34 and a booster engine (low-speed) channel 35. In preferred embodiments of the invention, the ramjet channel is of circular cross section and its leading rim 33 is downstream of the tapered closure 20 of the opening at the bottom of the external wall. A turbine engine 36 is shown in the booster engine channel.

The ramjet channel 34 remains open at all times to receive air from the inlet. The booster engine channel 35 is either open or closed depending on the position of the movable panel 37 at the forward end of the booster engine channel. The panel 37 is movable between an open position shown in solid lines and a closed position shown in dashed lines. When the panel is in its open position, all incoming air is divided between the ramjet channel 34 and the booster engine channel 35. When the panel is in its closed position, all incoming air is directed to the ramjet channel 34. Thus, there is no change in the total flow rate of incoming air that is used for combustion in the combined-cycle engine as the operation of the engine shifts from a booster stage to the ramjet stage; air from the entire transverse cross section of the air inlet is used at all times. Air is thus allowed to enter the ramjet while the booster engine is still in use and a maximum quantity of air is used at all times.

Movement of the panel 37 between the open and closed positions is achieved by pivoting the panel around a hinge or pivot axis 38, which in this embodiment is approximately co-planar with or slightly forward of the location of the closure point 20 in the bottom of the outer wall of the air inlet. As the panel moves toward its closed position, the use of the booster engine is gradually diminished until all air is fed to the ramjet engine. In preferred embodiments of the invention, the position of the panel provides each internal channel with a shape that serves the needs of the engine fed by that channel. Thus, for example, when the inlet air is subsonic relative to the vehicle, the desired panel position is one that causes the channel to diverge to form an expanding cross section and when the inlet air is supersonic, the desired panel position is one that causes the channel to converge to form a narrowing cross section before diverging downstream. In the embodiment shown in FIG. 3, the booster engine is a turbine engine which operates with subsonic inflow. Accordingly, when the movable panel 37 is in its open position, the panel is angled away from the axis 27 and the channel wall formed by the panel diverges. Likewise, when the movable panel is in the closed position, the panel is angled toward the axis 27 and the panel and the forward portion 17 of the capture tube form a continuous wall that provides the channel with a converging cross section. The length of the movable panel in this embodiment is equal to the distance between the pivot axis 38 and the leading rim 33 of the ramjet channel wall 32. All inlet air thus converges toward the throat which is formed by the ramjet channel wall 32.

As an optional feature, further control of the air speed through the booster channel 35 is achieved by the inclusion of a second movable panel 39 downstream of the first movable panel and pivotally mounted to the external wall of the air inlet at a separate pivot axis 40. Like the forward panel 37, this aft panel 39 can be adjusted to any angle between two positions, one shown in solid lines and the other in dashed lines. When the approaching air speed (relative to the vehicle) is supersonic and the turbine engine 36 shown in the booster channel is operating, the air must be decelerated to subsonic speed before it is fed to the turbine compressor. This can be achieved by placing the forward panel 37 and aft panel 39 in an intermediate position that would allow air to enter the booster channel and yet provide the channel with a converging/diverging geometry as is common in aircraft such as the F-14 and F-15 supersonic engines. Air entering at supersonic speed is first decelerated in the converging section of this converging/diverging geometry to sonic or near sonic speed and then decelerated further in the diverging section.

In view of their functions, the forward and aft panels can be termed a "flow-diverting panel" and a "diffuser panel," respectively. The flow-diverting and diffuser panels can be joined or can meet at their movable ends, but in some cases it is preferable to leave a small gap between them to manage the inlet boundary layer by removing low energy air from the inlet tract. In embodiments that include the diffuser panel as well as those that include only the flow-diverting panel, all moving parts are contained within the interior of the integrated air duct.

While only one booster engine channel 35 is shown in FIG. 3, two or more booster engine channels are preferably included and arranged around the circumference of the ramjet engine channel 34, since in preferred embodiments of this invention the ramjet channel will be approximately circular in cross section and occupy less than half of the cross sectional area of the engine. There may for example be three booster engine channels, as visible in the view shown in FIG. 4, which is a rear view facing the outlets of the channels. These channels include an upper channel 51, and two side channels 52, 53, with no bottom channel since the ramjet channel is positioned at the bottom of the vehicle. Other configurations within the scope of this invention will have a different number of booster channels that will either partially or completely encircle the ramjet channel, depending on the dimensions and geometries of the channels. A flow-diverting panel will be positioned within each booster engine channel, and when diffuser panels 39 are included, one will likewise be included within each booster engine channel.

In this embodiment of the invention, each booster channel is shaped as a shroud 54, extending radially outward from the ramjet channel 34 and forming a cavity within which the flow-diverting and diffuser panels can be raised to their open positions and lowered to their closed positions. In the view shown in FIG. 4, the panels occupy an intermediate position between fully open and fully closed, and only the diffuser 39 and the rear edge 55 of the flow-diverting panel are visible. The movement of the panels is indicated by the arrows 56 that show the movement of the rear edge 55 of the flow-diverting panel. In the fully closed position, this rear edge 55 is lowered to meet the wall of the ramjet channel 34.

Figure 4:
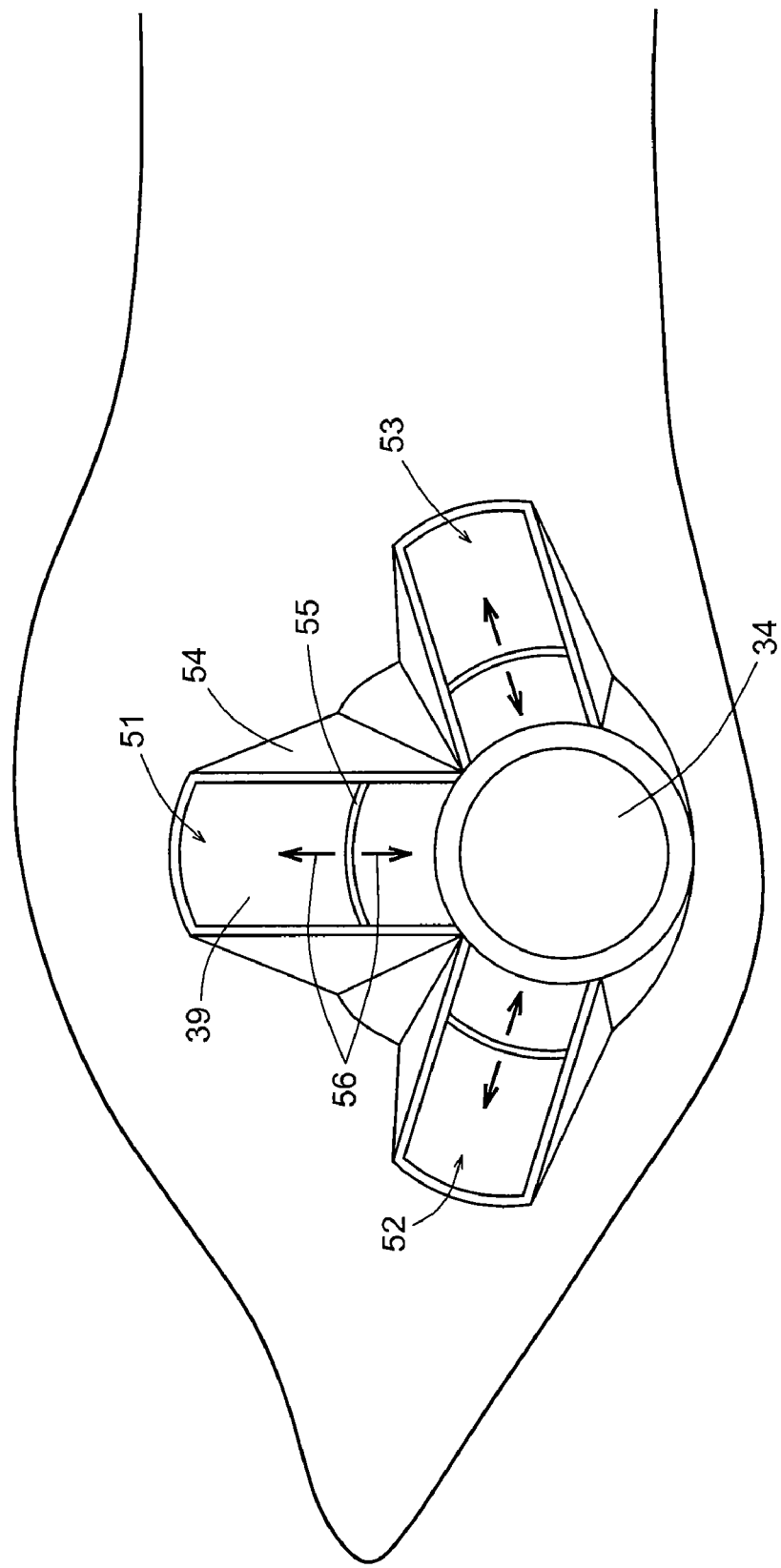
FIG. 4 is a rear view of the air inlet system of FIG. 3 taken along the line 4—4 of FIG. 3.
Figure 5:
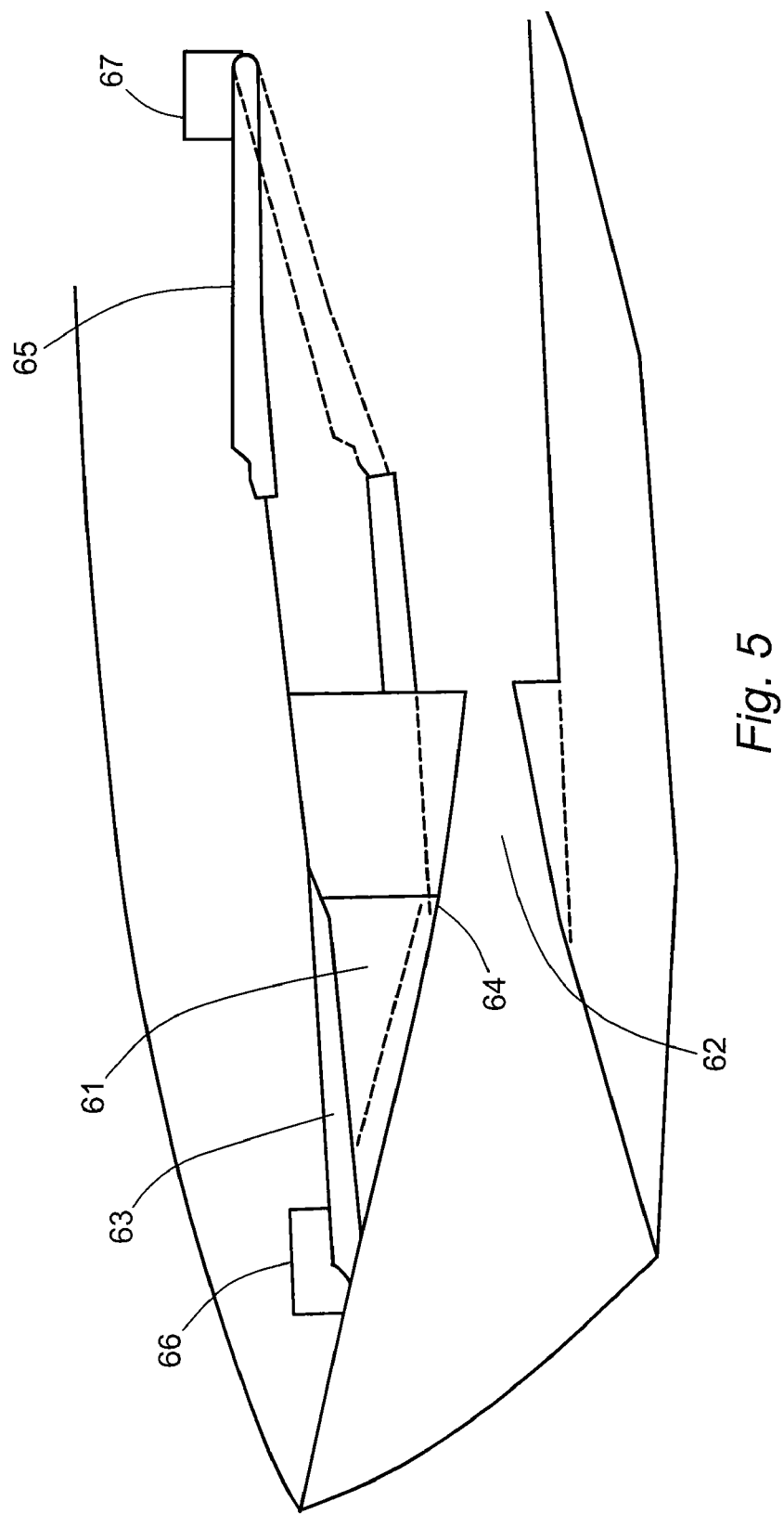
FIG. 5 is a longitudinal cross section of a second air inlet and combined-cycle engine system within the scope of the present invention.
Figure 6:
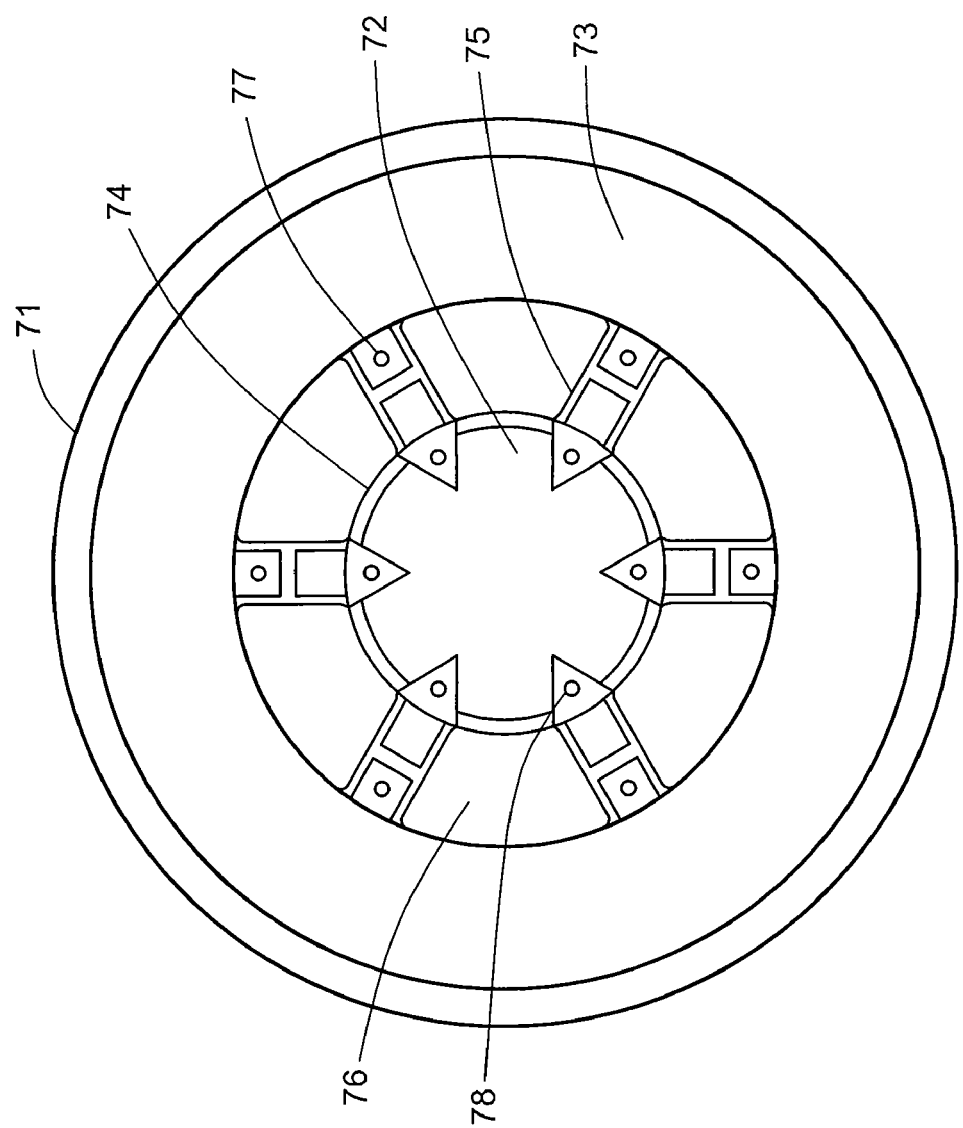
FIG. 6 is a rear view of the air inlet and engine system of FIG. 5.

FIGS. 5 and 6 depict a rocket-based combined-cycle engine which is a variation on the configuration shown in FIGS. 1 through 4. The high-speed engine in this rocket-based combined-cycle engine is a scramjet combustor, the booster engines are ramjet combustors fed by air-augmented rockets rather than turbojets, and the low-speed channel 61 that supplies air to the ramjet combustors is annular, completely encircling the channel 62 to the high-speed (scramjet) engine. The arrangement of the booster engines around the scramjet engine is likewise generally symmetrical, and the movable panels are likewise symmetrically arranged around the scramjet engine channel. FIG. 5 is a cross section of the engine, showing the various channels and one movable panel 63 for purposes of illustration. As in FIG. 3, the open position of the movable panel 63 is represented by solid lines and the closed position by dashed lines. When closed, the downstream end of the movable panel abuts the leading edge of the internal wall 64 that defines the scramjet engine channel.

In this particular embodiment, a second set of movable panels, represented in FIG. 5 by a single panel 65, is positioned at the downstream end of the ramjet combustor. Like the forward panels 63, these aft panels 65 have an open position, shown in solid lines, and a closed position, shown in dashed lines. The movement of these aft panels 65 between these two positions is coordinated with the movement of the forward panels 63 to fully open the ramjet combustor passages during low-speed operation and to fully close them at both the upstream and downstream ends during high-speed operation when the scramjet is fully operational, avoiding recirculation bubbles and dead volumes.

Movement of the forward and aft panels 63, 65 in the embodiment shown in FIG. 5 as well as those in the embodiment of FIGS. 3 and 4 and all embodiments of the invention is achieved by conventional means well known to those knowledgeable in the design and manufacture of aircraft vehicles. Actuators 66, 67 (FIG. 5) can be included in the vehicle itself to move the panels and control their position. Actuators of known design such as hydraulic actuators, pneumatic actuators, or electromagnetic actuators can be used, including linear motors, linear screws, solenoids, SC PM motors, stepper motors, induction motors, and others that will readily occur to the skilled engineer.

FIG. 6 is a rear view of the combined-cycle engine of FIG. 5. The external wall 71 of the engine and the high-speed (scramjet) engine channel 72 are both of substantially circular cross section and coaxial. The expanding section 73 of the external wall downstream of both the low-speed and high-speed combustors serves as the diverging section of both the low-speed and high-speed components of the engine. The tubular wall 74 of the air-supply channel to the high-speed engine is supported by a series of radial struts 75. The movable panels are positioned in the regions between the struts, and in this rear view the movable panels that are visible are the downstream panels 76. A rocket 77 is mounted within each strut to assist in startup of the engine and also to serve as fuel injectors to feed the ram combustor. These rocket/injectors 77 are contained within the low-speed channel 61 and their discharge is likewise retained in this channel.

Figure 7B:
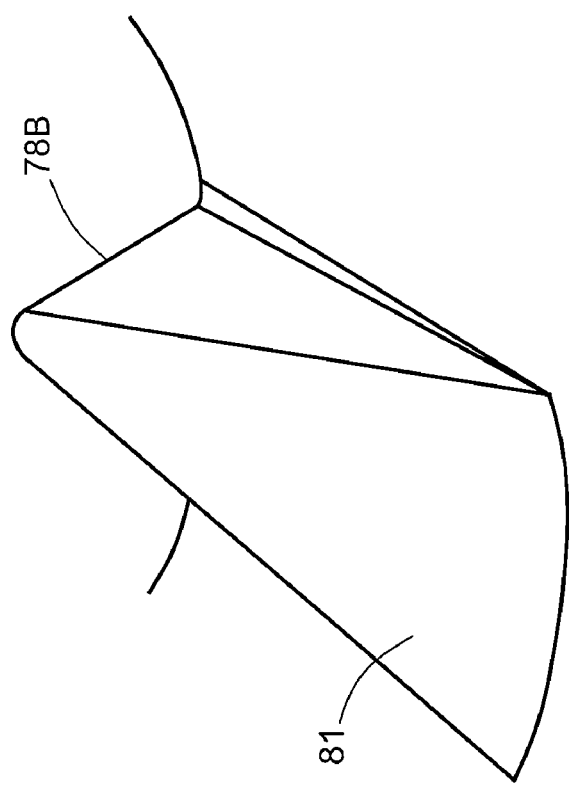
FIGS. 7A and 7B are front views of alternative examples of injectors mounted to the inside wall of the channel leading to the high-speed component of the system of FIGS. 5 and 6.
Figure 7A:
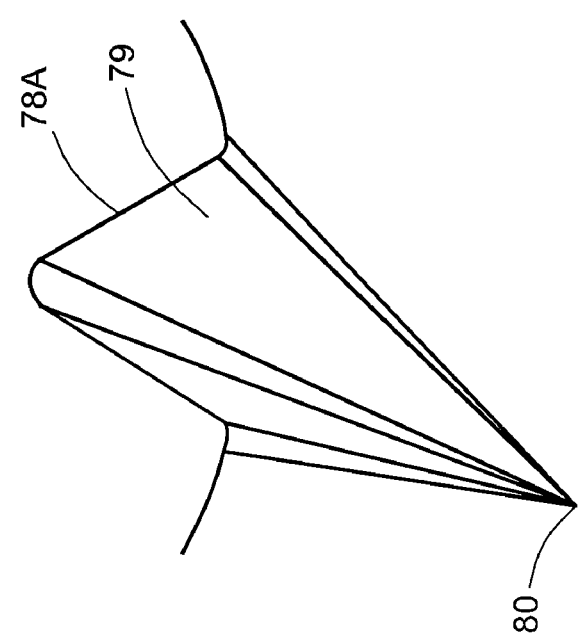

A series of injector pylons 78 extend into the high-speed channel 62. These injector pylons are symmetrically arranged around the periphery of the high-speed channel and inject fuel for operation of the scramjet. Rockets can also be placed within these injectors for firing to provide the engine with further thrust during boost and also when the engine is operating at very high speeds. Alternate shapes of the injector pylons 78 are shown in the front views of FIGS. 7A and 7B. The injector pylon 78*a* of FIG. 7A is a low drag design with a forward surface 79 that tapers toward the front to a point 80 on the channel wall. The forward surface of the injector pylon 78*b* of FIG. 7B is a broad ramp 81, producing a faster mixing of fuel and air.

In a still further variation, turbine engines, rockets, and a scramjet engine can be combined to form a turbine-and-rocket-based combined-cycle engine. In this variation, turbine engines serve as the booster engines receiving their combustion air through a peripheral channel as shown in FIGS. 1 through 4, or in a symmetrical arrangement uniformly distributed around the entire circumference of the high-speed channel, and rockets for additional thrust during boost and at very high speeds are positioned within mounts such as the injector pylons 78 shown in FIGS. 5 and 6.

The foregoing is offered primarily for purposes of illustration. Further variations and modifications that utilize the same novel features of this invention and therefore also fall within the scope of this invention will readily occur to the skilled aircraft engineer.

What is claimed is:

1. An integrated air duct for an aircraft engine with multiple propulsion systems, said integrated air duct comprising:
a fixed outer wall with an opening for incoming air,
a fixed inner wall dividing said duct into a first channel having a leading rim downstream of said opening and a second channel between said fixed inner wall and said fixed outer wall,
a movable panel mounted within said fixed outer wall at a pivot axis upstream of said leading rim of said first channel for pivoting between an open position allowing incoming air entering through said opening to enter said first and second channels simultaneously and a closed position obstructing air entry into said second channel and thereby causing substantially all incoming air entering through said opening to enter said first channel, and
means for moving said movable panel between said open position and said closed position.

2. The integrated air duct of claim 1 wherein said movable panel when in said closed position extends from said pivot axis to said leading rim of said first channel.

3. The integrated air duct of claim 1 wherein said movable panel when in said closed position forms a converging flow passage from said pivot axis to said leading rim of said first channel.

4. The integrated air duct of claim 1 wherein said movable panel when in said closed position forms a converging flow passage from said pivot axis to said leading rim of said first channel, and when in said open position forms a diverging passage from said pivot axis to said fixed outer wall.

5. The integrated air duct of claim 1 wherein said opening and said first channel each have transverse cross sections that are substantially circular.

6. The integrated air duct of claim 5 wherein said second channel fully encircles said first channel.

7. The integrated air duct of claim 5 wherein said first channel is substantially coaxial with said opening.

8. The integrated air duct of claim 5 wherein said first channel is axially offset relative to said second channel.

9. The integrated air duct of claim 5 comprising a plurality of said movable panels distributed along the circumference of said first channel.

10. The integrated air duct of claim 5 comprising a plurality of said movable panels distributed along the circumference of said first channels, said movable panels alternating with an equal number of struts joining said fixed inner wall to said fixed outer wall, each said strut having a fuel injector mounted thereto.

11. The integrated air duct of claim 1 wherein said movable panel is defined as a flow-diverting panel and said integrated air duct further comprises an additional movable panel defined as a diffuser panel, mounted within said fixed outer wall downstream of said flow diverting panel, said flow-diverting and diffuser panels each having a pivotally mounted end and a free end, said flow-diverting and diffuser panels meeting at said free ends.

12. The integrated air duct of claim 1 wherein said movable panel is defined as a flow-diverting panel and said integrated air duct further comprises a downstream movable panel mounted to said fixed outer wall downstream of said flow diverting panel, said flow-diverting and downstream panels when open providing a through-passage through said second channel and when closed forming an enclosed chamber in said second channel.

13. The integrated air duct of claim 1 in which said movable panel is one of a first plurality of movable panels each mounted within said fixed outer wall at a pivot axis upstream of said leading rim of said first channel for pivoting between an open position allowing incoming air to enter both said first and second channels and a closed position obstructing air entry into said second channel and thereby causing substantially all incoming air to enter said first channel, said integrated air duct further comprising a second plurality of movable panels mounted to said fixed outer wall downstream of said first plurality, each of said first and second pluralities of movable panels when open providing a through-passage through said second channel and when closed forming an enclosed chamber in said second channel.

14. The integrated air duct of claim 1 in which said movable panel is one of a first plurality of movable panels each mounted within said fixed outer wall at a pivot axis upstream of said leading rim of said first channel for pivoting between an open position allowing incoming air to enter both said first and second channels and a closed position obstructing air entry into said second channel and thereby causing substantially all incoming air to enter said first channel, said integrated air duct further comprising a second plurality of movable panels mounted to said fixed outer wall downstream of said first plurality, said first and second pluralities of movable panels arranged to be movable to a position providing said second channel with a convergent/divergent profile to decelerate incoming supersonic flow first to substantially sonic flow and then to subsonic flow.

15. The integrated air duct of claim 1 wherein said means for moving said movable panel is an electromagnetic actuator.

16. An aircraft engine having multiple propulsion systems, said aircraft engine comprising:
a ramjet,
a booster propulsion system, and
an integrated air duct comprising:
a fixed outer wall with an opening for incoming air,
a fixed inner wall dividing said duct into (i) a first channel extending from a leading rim downstream of said opening to said ramjet and (ii) a second channel between said fixed inner wall and said fixed outer wall leading to said booster propulsion system,
a movable panel mounted within said fixed outer wall at a pivot axis upstream of said leading rim of said first channel for pivoting between an open position allowing incoming air entering through said opening to enter said first and second channels simultaneously and a closed position obstructing air entry into said second channel and thereby causing substantially all incoming air entering through said opening to enter said first channel, and
means for moving said movable panel between said open position and said closed position.

17. The aircraft engine of claim 16 wherein said booster propulsion system is a turbojet.

18. The aircraft engine of claim 16 wherein said booster propulsion system is a rocket motor.

19. The aircraft engine of claim 16 wherein said booster propulsion system is a combination turbojet and rocket motor.

20. The aircraft engine of claim 16 wherein said ramjet is a scramjet and said engine further comprises rocket motors positioned within said first channel to supplement said scramjet.

21. The aircraft engine of claim 16 wherein said first channel is of substantially circular cross section and said movable panel is one of a plurality of movable panels mounted within said fixed outer wall at a pivot axis upstream of said leading rim of said first channel for pivoting between an open position allowing incoming air entering through said opening to enter both said first and second channels and a closed position causing substantially all incoming air entering through said opening to enter said first channel, said movable panels when in said closed position forming a converging flow passage toward said first channel.

22. The aircraft engine of claim 21 wherein said first channel is of substantially circular transverse cross section and said second channel fully encircles said first channel, said movable panels distributed around said first channel.

23. The aircraft engine of claim 21 wherein said first channel is of substantially circular transverse cross section and is axially offset relative to said second channel.

* * * * *